(12) United States Patent
Shimada

(10) Patent No.: US 11,606,046 B2
(45) Date of Patent: Mar. 14, 2023

(54) VIBRATION TYPE ACTUATOR, OPTICAL APPARATUS, AND ELECTRONIC APPARATUS

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 17/002,119

(22) Filed: Aug. 25, 2020

(65) Prior Publication Data
US 2021/0067059 A1 Mar. 4, 2021

(30) Foreign Application Priority Data

Aug. 30, 2019 (JP) .............................. JP2019-158972

(51) Int. Cl.
| | |
|---|---|
| *H02N 2/06* | (2006.01) |
| *G02B 7/09* | (2021.01) |
| *G03B 13/36* | (2021.01) |
| *H02N 2/04* | (2006.01) |
| *H04N 5/225* | (2006.01) |
| *H04N 5/232* | (2006.01) |

(52) U.S. Cl.
CPC .................. *H02N 2/06* (2013.01); *G02B 7/09* (2013.01); *G03B 13/36* (2013.01); *H02N 2/04* (2013.01); *H04N 5/2253* (2013.01); *H04N 5/2254* (2013.01); *H04N 5/232* (2013.01)

(58) Field of Classification Search
CPC .......... H02N 2/06; H02N 2/04; H02N 2/0085; H02N 2/026; H02N 2/103; H02N 2/0015; H02N 2/163; H02N 2/14; H02N 2/142; H02N 2/062; H02N 2/106; G02B 7/09; G02B 7/08; G03B 13/36; G03B 2205/0061; G03B 3/10; H04N 5/2253; H04N 5/2254; H04N 5/232; H04N 5/23212; H04N 5/2257; G06F 3/016
See application file for complete search history.

(56) References Cited

U.S. PATENT DOCUMENTS

| | | | | |
|---|---|---|---|---|
| 6,242,846 | B1 * | 6/2001 | Ashizawa ............... | H02N 2/103 310/323.02 |
| 2004/0189150 | A1 * | 9/2004 | Yamamoto ............. | H02N 2/026 310/323.02 |
| 2004/0251782 | A1 * | 12/2004 | Johansson ............ | H02N 2/0015 310/328 |
| 2005/0104476 | A1 * | 5/2005 | Maruyama .......... | H01L 41/0835 310/328 |

(Continued)

FOREIGN PATENT DOCUMENTS

JP 2010-158127 A 7/2010

*Primary Examiner* — Abdelaaziz Tissire
(74) *Attorney, Agent, or Firm* — Canon U.S.A., Inc. I.P. Division

(57) ABSTRACT

A vibration type actuator includes a vibrating body including an elastic body and an electro-mechanical energy conversion element, a contact body contacting the vibrating body, a flexible printed board provided with a concave portion on a surface opposite to a surface contacting the electro-mechanical energy conversion element and configured to supply electric power to the electro-mechanical energy conversion element, and a holding member provided with a projection portion engaging with the concave portion.

14 Claims, 15 Drawing Sheets

(56) References Cited

U.S. PATENT DOCUMENTS

| | | | |
|---|---|---|---|
| 2010/0176687 A1* | 7/2010 | Nagaoka | H01L 41/0906 310/323.16 |
| 2011/0031848 A1* | 2/2011 | Sakai | H02N 2/0085 310/366 |
| 2011/0278987 A1* | 11/2011 | Oda | H04N 5/2328 310/323.16 |
| 2011/0309722 A1* | 12/2011 | Seki | G02B 7/102 310/323.16 |
| 2012/0274180 A1* | 11/2012 | Araki | H02N 2/005 310/323.01 |
| 2013/0278112 A1* | 10/2013 | Yokoyama | H01L 41/337 29/25.35 |
| 2013/0334927 A1* | 12/2013 | Fujimoto | H02N 2/0035 310/314 |
| 2015/0137663 A1* | 5/2015 | Kimura | H02N 2/0055 310/323.02 |
| 2016/0226402 A1* | 8/2016 | Morita | H02N 2/0075 |
| 2016/0246052 A1* | 8/2016 | Shimada | H01L 41/042 |
| 2017/0038554 A1* | 2/2017 | Nakashita | G03B 3/10 |
| 2018/0041141 A1* | 2/2018 | Shinzato | H02N 2/0015 |
| 2019/0103822 A1* | 4/2019 | Shinzato | G02B 21/26 |
| 2020/0382023 A1* | 12/2020 | Shimada | H02N 2/0065 |
| 2022/0045630 A1* | 2/2022 | Araki | B25J 15/0019 |

* cited by examiner

FIG.3
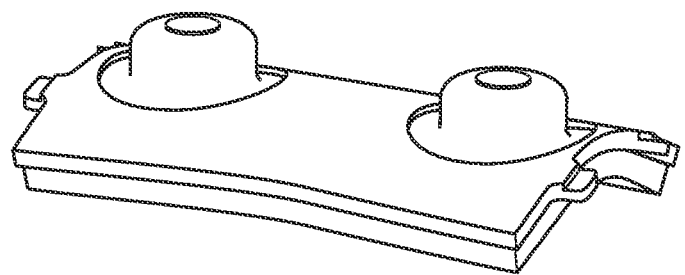
MODE A
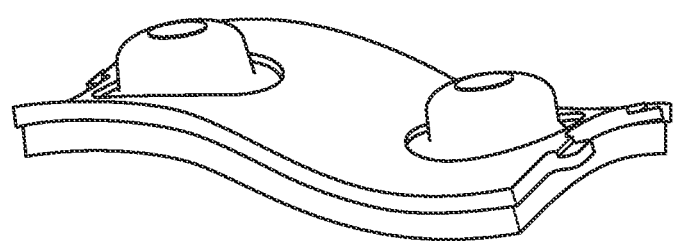
MODE B

FIG.6
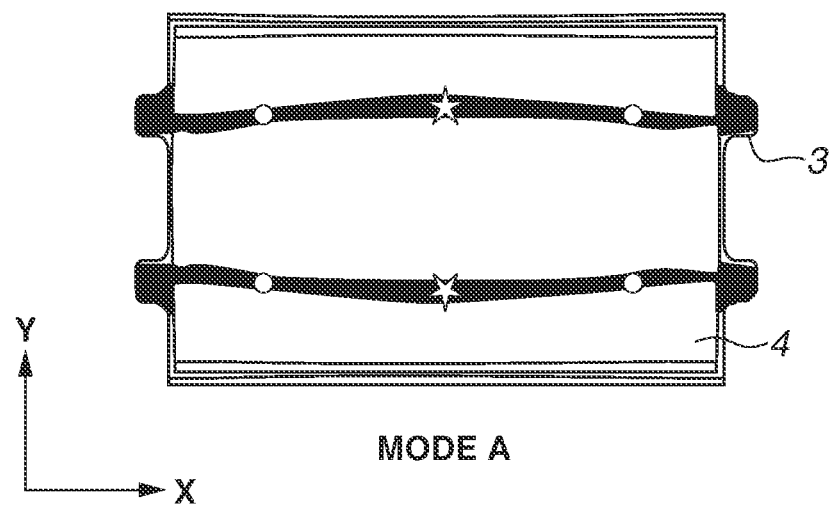
MODE A
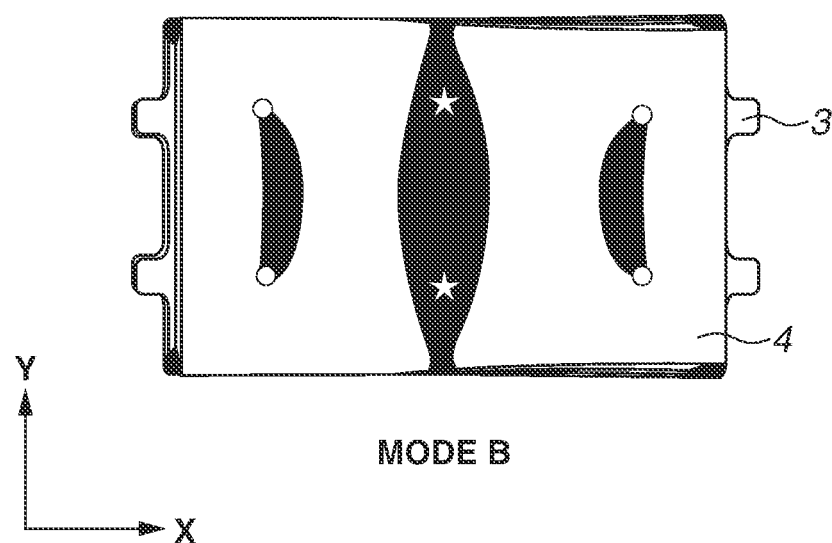
MODE B

VIBRATION TYPE ACTUATOR, OPTICAL APPARATUS, AND ELECTRONIC APPARATUS

BACKGROUND

Field of the Disclosure

The present disclosure relates to a vibration type actuator, an optical apparatus, and an electronic apparatus.

Description of the Related Art

Vibration type actuators adopting electro-mechanical energy conversion elements such as a piezoelectric element are known to include various configurations. For example, a vibration type actuator, which includes a vibrating body, a driven body (contact body), and a pressure unit, is known. The vibrating body includes a plate-like elastic body with two projections on a front surface and a piezoelectric element bonded on a back surface. The driven body is in contact with the vibrating body. The pressure unit brings the two projections into pressure contact with the driven body. In the vibration type actuator, a predetermined alternating-current (AC) voltage is applied to an electro-mechanical energy conversion element to generate elliptical motion or circular motion on tip ends of the two projections in a plane including a direction connecting the two projections and a projection direction of the projections. In this way, the driven body receives a frictional driving force from the two projections, and the vibrating body and the driven body can be relatively moved in the direction connecting the two projections.

It is important to adopt a mechanism for stably holding a vibrating body so as not to dampen a vibration amplitude excited on the vibrating body as much as possible in terms of stabilizing a driving characteristic of a vibration type actuator and obtaining high performance. Therefore, various discussions have been made regarding a holding member of a vibrating body.

Japanese Patent Application Laid-Open No. 2010-158127 discusses a vibration type driving device in which a hole portion is provided on a surface of a piezoelectric element and the hole portion is engaged with a projection portion provided on a holding member. A pressure spring applies a force to the holding member, so as to apply a predetermined pressure force between a driven body and a vibrating body, and positional displacement due to a backlash and the like can be restrained between the holding member and the vibrating body.

However, the technique discussed in Japanese Patent Application Laid-Open No. 2010-158127 can have an issue of low mass-productivity.

A piezoelectric element is generally made of ceramics and difficult to be machined since ceramics are harder and more brittle than metal. Even if the piezoelectric element can be machined, a hole portion to be provided thereon will reduce a volume of the piezoelectric element by that amount, and a motor output is reduced. The present inventor confirmed that a maximum speed is reduced even if a minute V groove is provided on a surface of a piezoelectric element.

SUMMARY

One embodiment of the present disclosure includes a vibration type actuator including a structure capable of simply and stably holding a vibrating body without significantly deteriorating its performance. According to an aspect of the present disclosure, a vibration type actuator includes a vibrating body including an elastic body and an electro-mechanical energy conversion element, a contact body contacting the vibrating body, a flexible printed board provided with a concave portion on a surface opposite to a surface contacting the electro-mechanical energy conversion element and configured to supply electric power to the electro-mechanical energy conversion element, and a holding member provided with a projection portion engaging with the concave portion.

Further features of the present disclosure will become apparent from the following description of exemplary embodiments with reference to the attached drawings.

BRIEF DESCRIPTION OF THE DRAWINGS

FIG. 3 is a vibration mode diagram according to the first exemplary embodiment.

FIG. 6 is a diagram of node positions in the vibration type actuator according to the first exemplary embodiment.

DESCRIPTION OF THE EMBODIMENTS

Exemplary embodiments of the present disclosure provide a vibration type actuator including a vibrating body including an elastic body and an electro-mechanical energy conversion element, a contact body contacting the vibrating body, a flexible printed board provided with a concave portion on a surface opposite to a surface contacting the electro-mechanical energy conversion element and configured to supply electric power to the electro-mechanical energy conversion element, and a holding member provided with a projection portion engaging with the concave portion.

The exemplary embodiments will be described in detail below with reference to the attached drawings.

A "contact body" is a member that is in contact with a vibrating body and moves relative to the vibrating body by a vibration generated in the vibrating body. The contact between the contact body and the vibrating body is not limited to a direct contact without intervention of another member between the contact body and the vibrating body. The contact between the contact body and the vibrating body may be an indirect contact with intervention of another member between the contact body and the vibrating body as long as the contact body moves relative to the vibrating body by the vibration generated in the vibrating body. "Another member" is not limited to a member (e.g., a high friction material made of a sintered body) independent of the contact body and the vibrating body. "Another member" may be a surface treated portion formed on the contact body or the vibrating body by plating, nitriding treatment, and the like.

Figure 1:
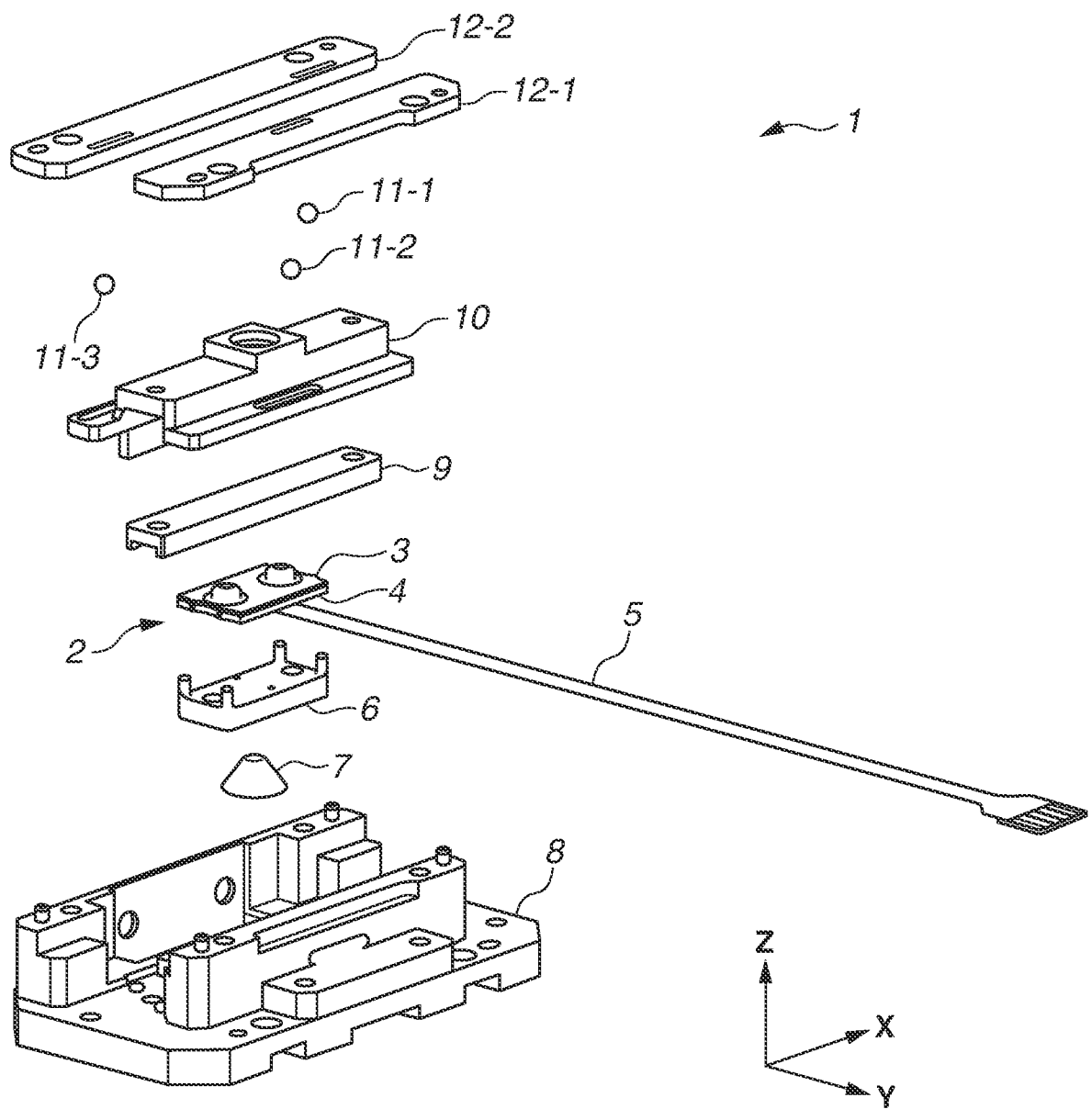
FIG. 1 is an exploded perspective view of a vibration type actuator according to a first exemplary embodiment.
Figure 2:
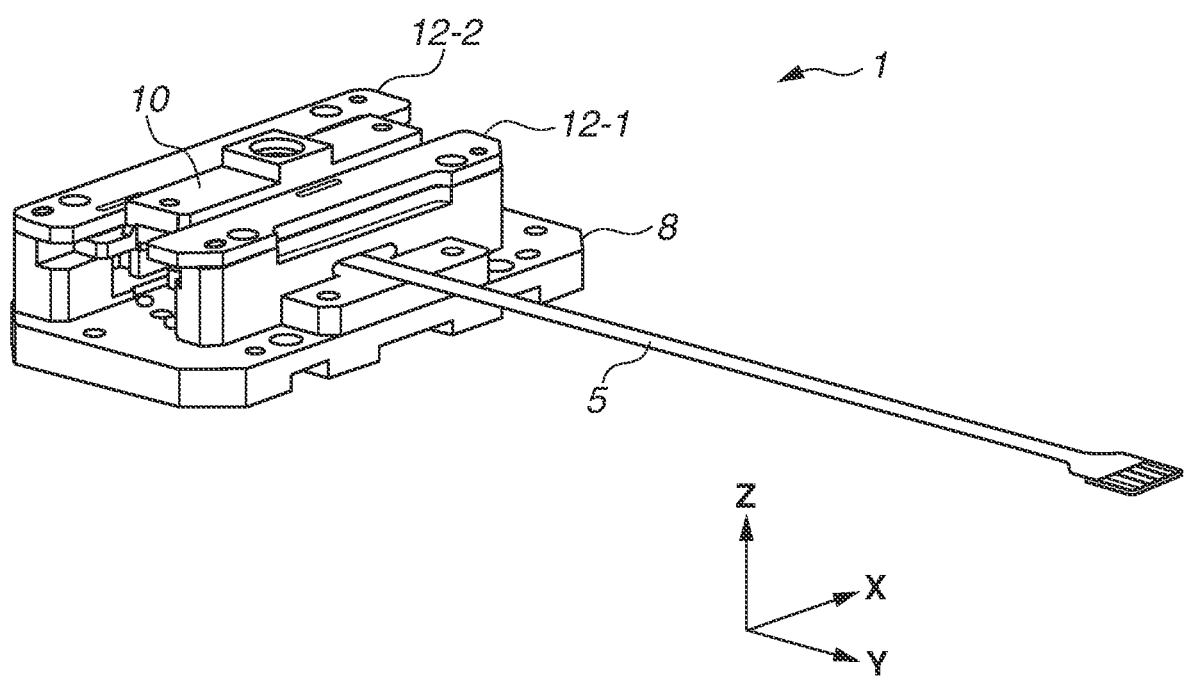
FIG. 2 is an assembly perspective view of the vibration type actuator according to the first exemplary embodiment.

A first exemplary embodiment is an example in which the present disclosure is applied to a linear type vibration type actuator and is described in detail with reference to FIGS. 1 to 8. FIGS. 1 and 2 are respectively an exploded perspective view and an assembly perspective view of a vibration type actuator 1 according to the first exemplary embodiment. A movement direction and a pressure direction of a slider 9 as a contact body are respectively defined as an X direction and a Z direction, and a direction perpendicular to the X direction and the Z direction is defined as a Y direction.

A vibrating body 2 is formed in such a manner that a piezoelectric element 4 (electro-mechanical energy conversion element) is fixed to an elastic body 3 by an adhesive and the like on one surface and a flexible printed board 5 is fixed to the piezoelectric element 4 on a surface opposite to the surface on which the elastic body 3 is fixed. As a fixing method of the piezoelectric element 4 and the flexible printed board 5, an anisotropic conductive paste or an anisotropic conductive film, which enables current to pass only in the Z direction, is used.

Figure 4:
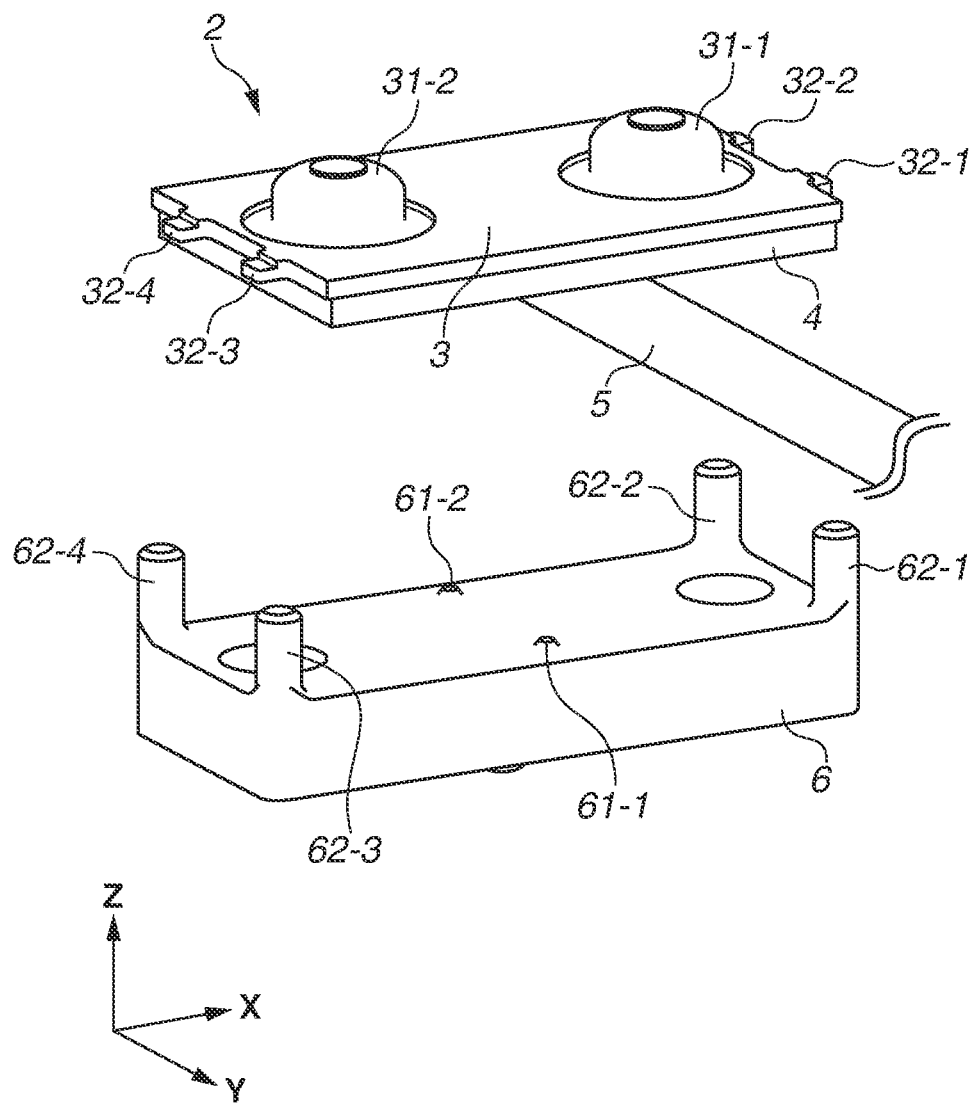
FIG. 4 is an exploded perspective view of a vibrating body holding mechanism according to the first exemplary embodiment.
Figure 5:
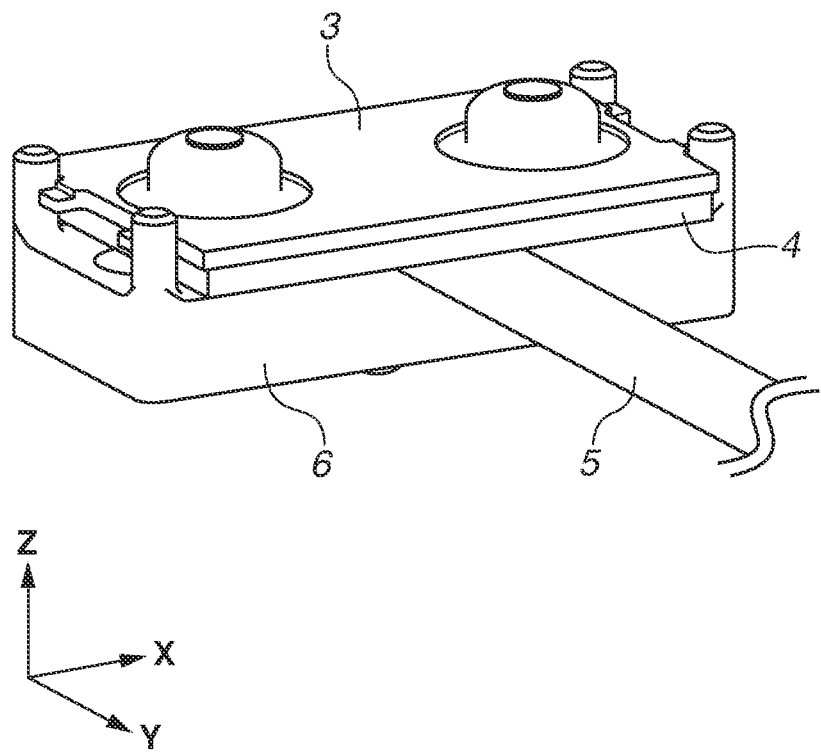
FIG. 5 is an assembly perspective view of the vibrating body holding mechanism according to the first exemplary embodiment.

It is desirable to use a material such as metal and ceramics having low vibration damping properties for the elastic body 3. Regarding manufacturing of the elastic body 3, a projection portion 31 (refer to FIG. 4) may be integrally formed by press molding or cutting, or the projection portion 31 may be separately manufactured and then fixed to the elastic body 3 by welding or bonding. A plurality of projection portions 31 may be provided as illustrated in FIG. 4 according to the present exemplary embodiment, or a single projection portion 31 may be provided.

Lead zirconate titanate is used for the piezoelectric element 4. Alternatively, the piezoelectric element 4 may include a lead-free piezoelectric material such as barium titanate and sodium bismuth titanate as a main component. A lead-free piezoelectric material is a piezoelectric material with a lead content being 1000 ppm or less.

Electrode patterns, which are not illustrated, are formed on both surfaces of the piezoelectric element 4, and electric power is supplied from the flexible printed board 5.

A pressure member 6 for pressing and supporting the vibrating body 2 is provided below the vibrating body 2. The pressure member 6 is applied with a pressure force in the Z direction by a pressure spring 7, and a base 8 as a pressure reception member receives a reaction force thereof. A conical coil spring is adopted as the pressure spring 7 to reduce a size of the vibration type actuator 1 in the Z direction. A shape of the coil is simply illustrated in the drawing.

The slider 9 is provided above the vibrating body 2 and is in pressure contact with the projection portion 31 of the elastic body 3. The slider 9 is fixed to a slider holder 10, and the slider 9 and the slider holder 10 are driven together in the X direction. Rubber for vibration damping may be provided between the slider 9 and the slider holder 10. The slider 9 is made of metal having high abrasion resistance, ceramic, resin, or a composite material thereof. Particularly, a nitrided stainless-steel material such as SUS420J2 is desirable in terms of abrasion resistance and mass-productivity.

Three balls 11 (11-1, 11-2, and 11-3) are sandwiched between three pairs of upper and lower rails provided on the slider holder 10 and ball rails 12, and the ball rails 12 are fixed to the base 8, so that the slider 9 and the slider holder 10 can move in the X direction with respect to other components. An output transmission member having a desired shape is attached to the slider holder 10, so that an output is transmitted to the outside. According to the present exemplary embodiment, an example is described in which the vibrating body 2 is fixed, and the slider 9 is moved. However, to the contrary, the slider 9 can be fixed, and the vibrating body 2 can be moved.

Next, a vibration mode excited on the vibrating body 2 is described with reference to FIG. 3. According to the present exemplary embodiment, an alternating-current (AC) voltage is applied to the piezoelectric element 4 via the flexible printed board 5 to excite two different out-of-plane bending vibrations in the vibrating body and a vibration is generated by combining these vibrations.

A mode A as a first vibration mode is a primary out-of-plane bending vibration mode in which two nodes are generated in parallel to the X direction (i.e., longitudinal direction of the vibrating body 2). Two projection portions 31-1 and 31-2 (refer to FIG. 4) are displaced in the Z direction (i.e., pressure direction) by a vibration in the mode A. A mode B as a second vibration mode is a secondary out-of-plane bending vibration mode in which three nodes are generated nearly parallel to the Y direction, which is a transverse direction of the vibrating body 2. The two projection portions 31-1 and 31-2 are displaced in the X direction by a vibration in the mode B.

By combining vibrations in the modes A and B, the two projection portions 31-1 and 31-2 make elliptical motion or circular motion in a ZX plane. The projection portions 31-1 and 31-2 are brought into pressure contact with the slider 9, so that a frictional force is generated in the X direction, and a driving force (thrust force), which relatively moves the vibrating body 2 and the slider 9, is generated. According to the present exemplary embodiment, the vibrating body 2 is held by a method described below, and thus the slider 9 as the contact body moves in the X direction. The vibrating body 2 can be configured to move in the X direction by fixing a position of the contact body by a fixing member and the like.

It is necessary to support the vibrating body 2 without hindering the vibrations (displacements) two vibration modes excited in the vibrating body 2 in order to efficiently drive the vibration type actuator 1. To this end, it is desirable to support the vibrating body 2 near the nodes in the two vibration modes. With the above-described reason, the pressure member 6 is provided with two projection portions 61 (61-1 and 61-2) as illustrated in FIG. 4 in order to press and hold the nodes common to the two vibration modes excited in the vibrating body 2. FIG. 6 illustrates contact positions of the projection portions 61 and node positions in each vibration mode. In order to simplify the drawing, the flexible printed board 5 is omitted.

In FIG. 6, portions painted in black indicate vicinities of the nodes. More specifically, a portion at which a displacement is 35% or less of a maximum displacement in each vibration mode is illustrated in black. In the present exemplary embodiment, a portion at which the displacement is 35% or less of the maximum displacement is defined as a node vicinity. In a case where the modes A and B are overlapped, six portions at which black portions overlap with each other, i.e., six common node vicinities (four circles and two stars) are generated. The two portions indicated by stars in these six portions are desirable to support the vibrating body 2 more efficiently from the following two viewpoints.

First, at the two portions are smaller than displacements at the other four portions. Second, when it is viewed in a ZX cross section, the two portions are pressed at one point in the X direction, so that an equalizer function is exerted around a Y axis of the projection portions 31-1 and 31-2 and the slider 9, and contact with the projection portions 61-1 and 61-2 can be equalized. With the above-described reasons, the star portions in FIG. 6 are brought into contact with the projection portions 61-1 and 61-2, and thus the vibrating body 2 is pressed more efficiently.

The elastic body is rectangular, and the star portions correspond to two points among points at which two node lines generated along a longitudinal direction of the elastic body in the primary out-of-plane bending vibration mode A intersect with three node lines generated along a traverse direction of the elastic body in the secondary out-of-plane bending vibration mode B and which are on a center node line in the three node lines.

Figure 7:
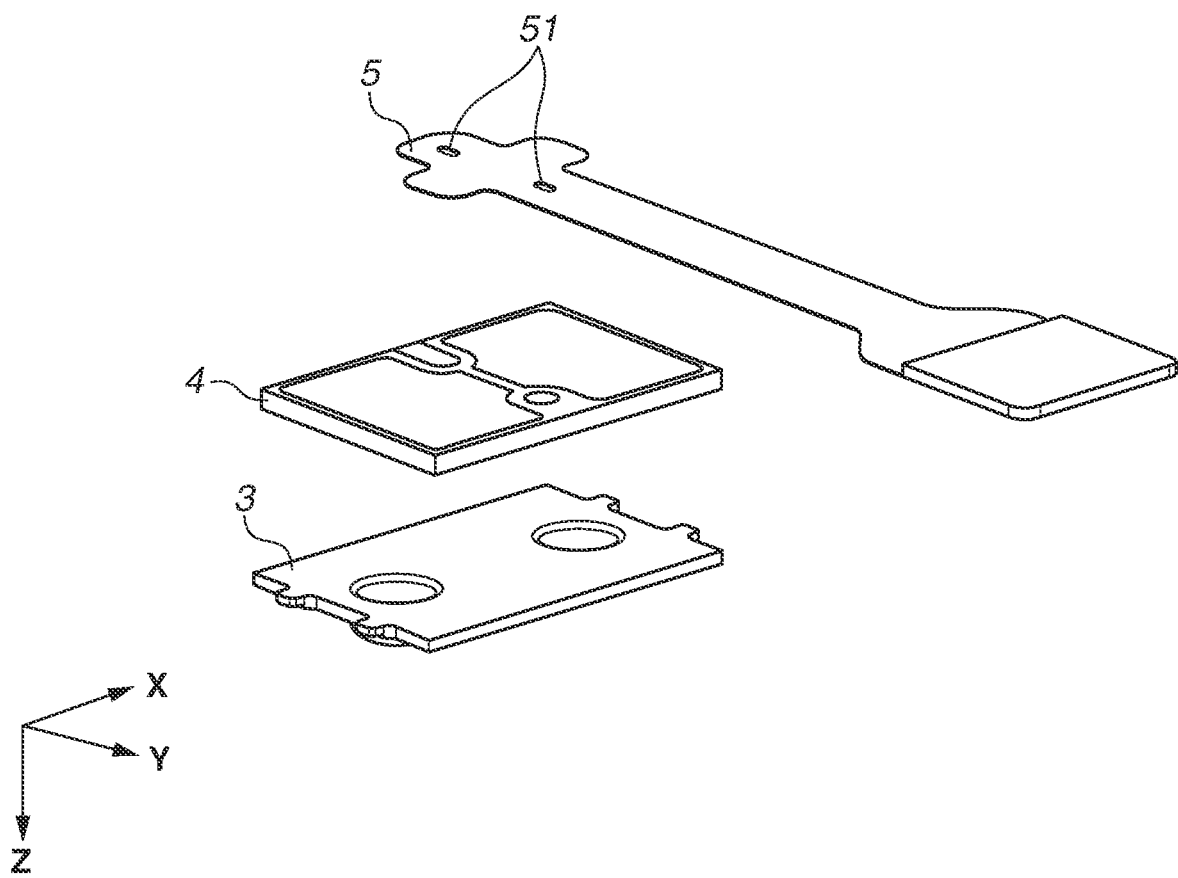
FIG. 7 is an exploded perspective view of a vibrating body according to the first exemplary embodiment.

A configuration of a pressure contact portion of the projection portions 61 and the vibrating body 2 is described in detail with reference to FIGS. 7 and 8. FIG. 7 is an exploded perspective view of the vibrating body 2. Two hole portions 51 are formed on the flexible printed board 5. The flexible printed board 5 is bonded to the piezoelectric element 4 in such a manner that the hole portions 51 match positions of common nodes (star portions in FIG. 6) of the two vibration modes. Alternatively, the flexible printed board 5 without hole portions is bonded to the piezoelectric element 4, and then the hole portions 51 may be formed by laser processing and the like. A process for punching an outer shape and the hole portions 51 at the same time by pressing does not increase in cost and has high mass-productivity compared with a conventional flexible printed board.

Figure 8:
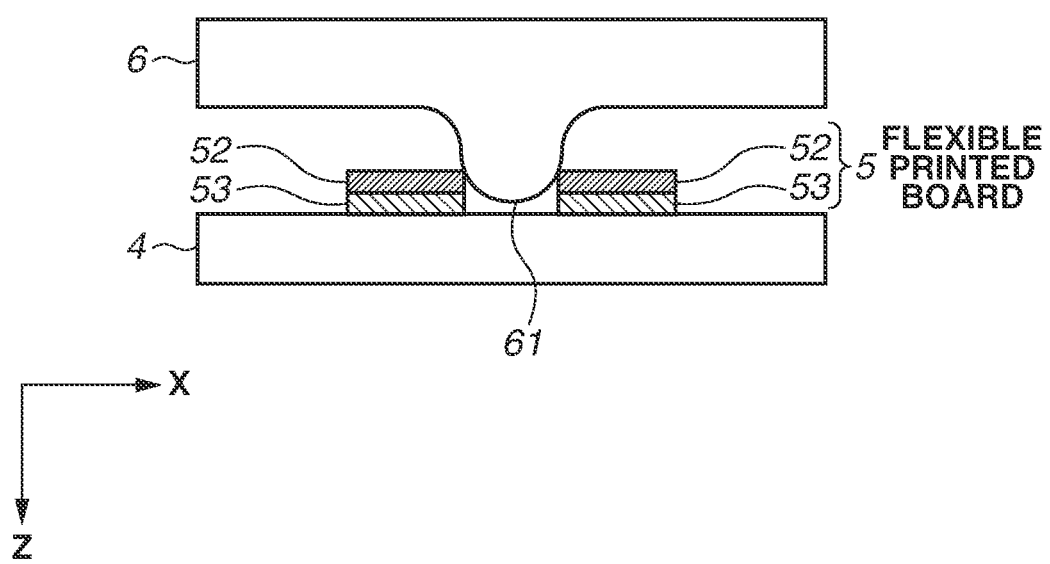
FIG. 8 is a cross-sectional view of a holding member according to the first exemplary embodiment.

FIG. 8 is a cross-sectional view near the contact portion of the vibrating body 2 and the pressure member 6, and the elastic body 3 is omitted from the drawing. The flexible printed board 5 has a three-layered structure including a base film 52 made of a resin film, a wiring pattern 53, and a cover film 54, and the cover film 54 is not arranged near the pressure contact portion in order to provide conduction to the piezoelectric element 4. The projection portions 61 are arranged to be inserted into the hole portions 51 and are pressed in the Z direction, and thus the vibrating body 2 engages with the pressure member 6. Accordingly, the vibrating body 2 does not move with respect to the pressure member 6 in a case where a reaction force is applied thereto by driving of the slider 9.

In other words, the flexible printed board 5 is characterized in that the flexible printed board 5 includes the wiring pattern 53 and a non-wiring portion in which the wiring pattern 53 is not formed, and a concave portion is configured with the non-wiring portion and the wiring patterns 53 provided on both sides of the non-wiring portion. The concave portion may be a void like the hole portion 51 illustrated in FIGS. 7 and 8 or may have a structure in which a resin film covers the non-wiring portion and the wiring patterns provided on the both sides of the non-wiring portion as described below.

On the other hand, the pressure member 6 is provided with four loose fitting portions 62 (62-1, 62-2, 62-3, and 62-4) for supporting (loosely fit) an outer circumferential surface of the vibrating body 2 with backlash. The loose fitting portions 62 exert a positioning function at the time of assembly of the vibrating body 2.

In other words, the vibration type actuator is constructed in which the elastic body is rectangular and provided with a rectangular portion and at least two extending portions independent of each other, and different projection portions provided on the holding member are in contact with the rectangular portion and the extending portions. More specifically, a plurality of the different projection portions loosely fits and supports four corners of the rectangular portion of the elastic body.

As described above, according to the present exemplary embodiment, the projection portions 61 of the pressure member 6 engage with the hole portions 51 of the flexible printed board 5, to hold the vibrating body 2. In this way, the vibration type actuator, which adopts the holding method simpler than the conventional method, has high mass-productivity, and does not deteriorate performance, can be provided.

The method for generating elliptical motion or circular motion on a contact surface in the linear type vibration type actuator according to the present disclosure is not limited to the above-described method. For example, vibrations in vibration modes different from the above-described modes may be combined, and a vibration in a vertical vibration mode for expanding and contracting the elastic body in the longitudinal direction may be combined with a vibration in a bending vibration mode.

Any driving method can be adopted as long as the method can generate elliptical motion and circular motion on a contact surface by a combination of a vibration mode for displacing the contact surface in a movement direction of a driven body and a vibration mode for displacing the contact surface in a pressure direction, and a common node for pressing and holding is included.

The present disclosure can provide a vibration type actuator including the above-described configuration and thus substantially maintain positions of a vibrating body and a holding member at a time of being driven.

Figure 9A:
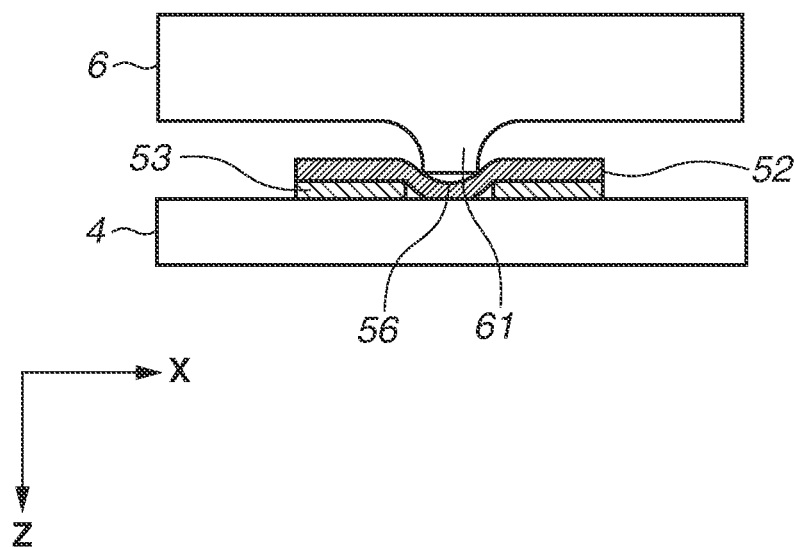
FIGS. 9A and 9B are cross-sectional views of a holding member according to a second exemplary embodiment.
Figure 9B:
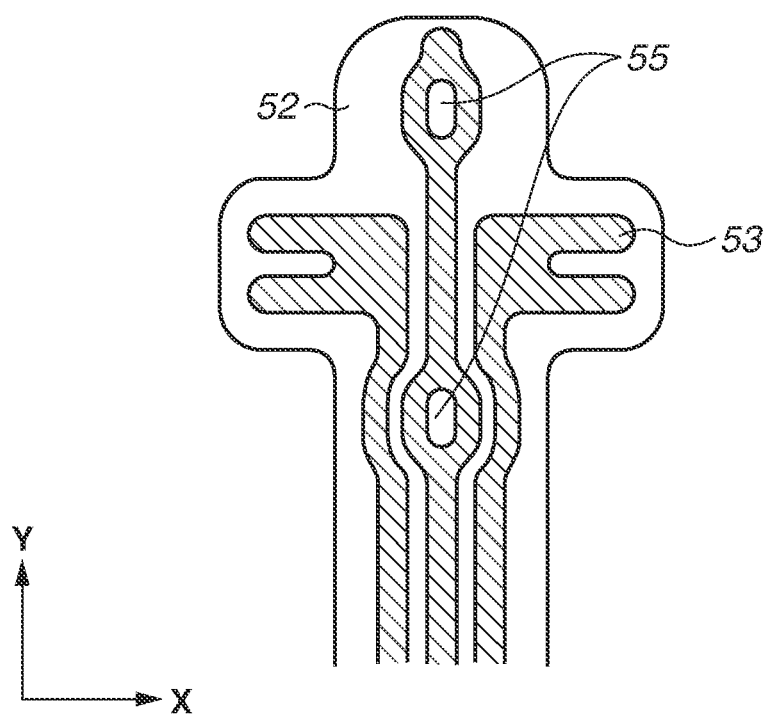

FIG. 9A is a cross-sectional view near a contact portion of a vibrating body 2 and a pressure member 6 according to a second exemplary embodiment. An elastic body 3 is omitted from the drawing as with the first exemplary embodiment. FIG. 9B illustrates a flexible printed board 5 according to the second exemplary embodiment, and a cover film 54 is omitted from the drawing for description. Spaces 55 covered with a wiring pattern 53 are formed near positions matching common nodes of two standing waves in the X direction. An anisotropic conductive film or an anisotropic conductive sheet is arranged on a surface of the base film 52 and the wiring pattern 53. In a manufacturing process of the vibrating body 2, when the base film 52 is heated and pressed to be bonded to the piezoelectric element 4, the base film 52 is bonded to the space 55 while being crushed, so that a U-shaped concave portion 56 is formed. A projection portion 61 of a pressure member 6 is brought into pressure contact with the concave portion 56, so that the vibrating body 2 can be held.

It is desirable that a contact area of the projection portion 61 is as small as possible so as not to hinder the vibration of the vibrating body 2. However, in a case where the concave portion is formed by press working of which cost is particularly cheapest in the first exemplary embodiment, there is a limit to a width of the concave portion due to a constraint of a press die. On the other hand, according to the present exemplary embodiment, the wiring pattern 53 is formed by etching, so that a narrower groove width can be achieved compared with the press working. Accordingly, the contact area of the projection portions 61 can be reduced, and the vibrating body 2 can be held more efficiently.

Figure 11:
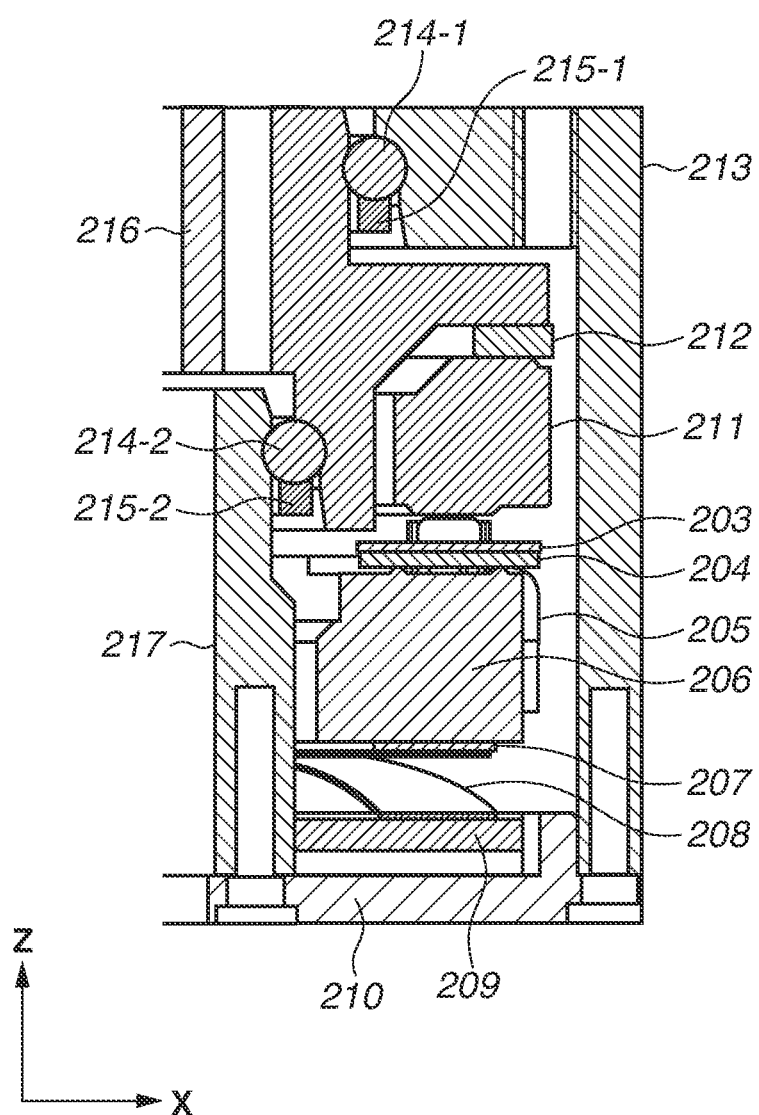
FIG. 11 is a cross-sectional view of the vibration type actuator according to the third exemplary embodiment.
Figure 12:
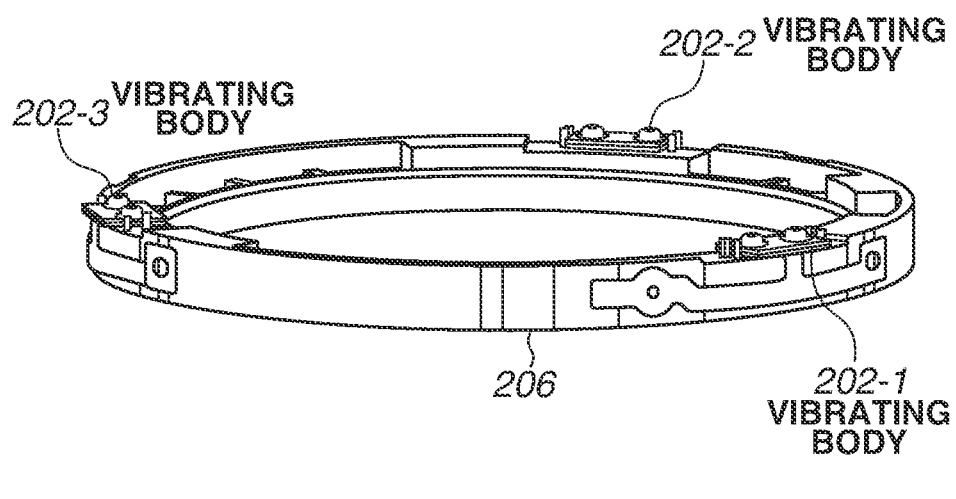
FIG. 12 is a perspective view of a vibrating body and a ring base according to the third exemplary embodiment.

A third exemplary embodiment is described with reference to FIGS. 10 to 12. The present exemplary embodiment relates to a vibration type actuator in which a plurality of vibrating bodies is arranged with respect to an annular contact body.

Figure 10:
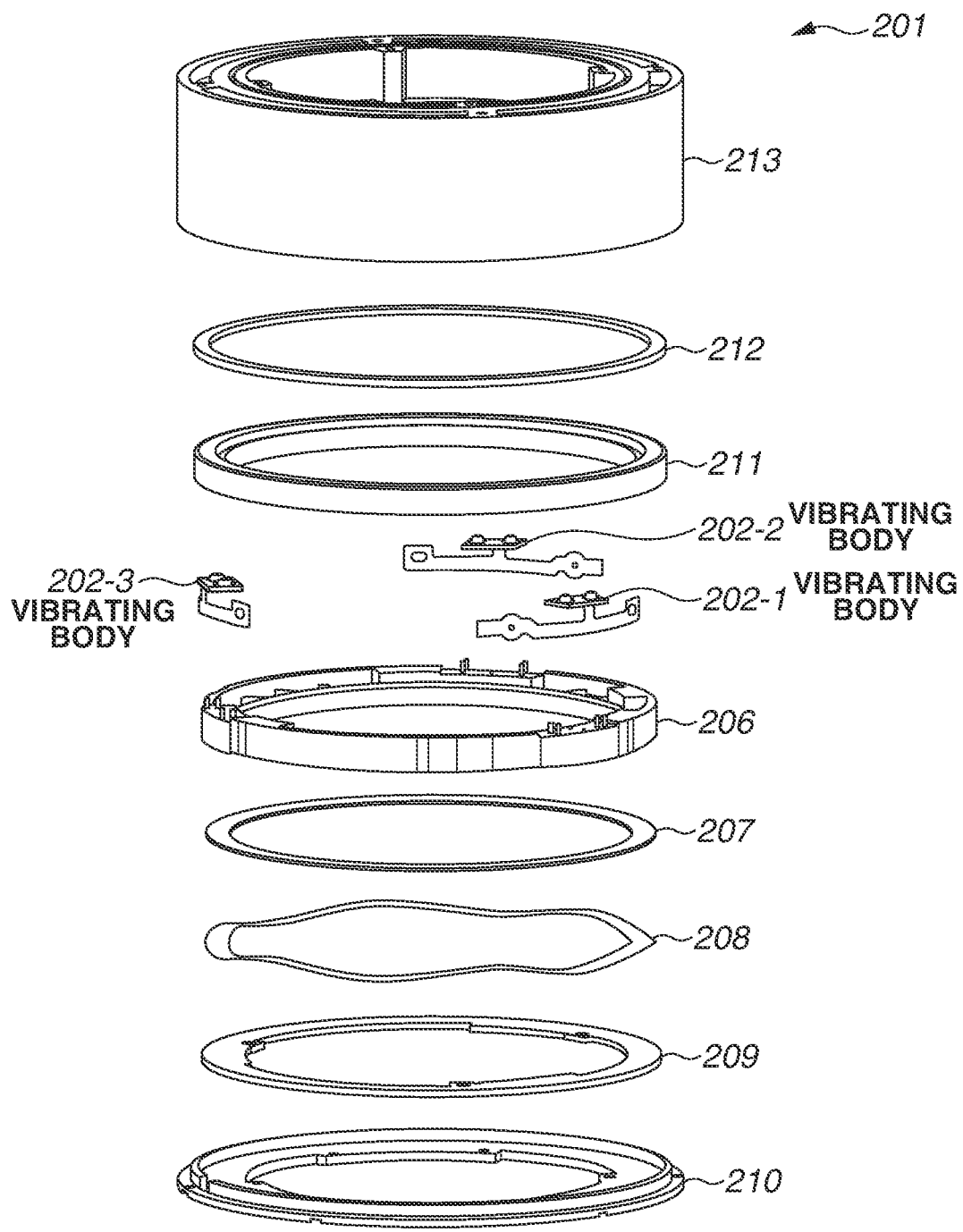
FIG. 10 is an exploded perspective view of a vibration type actuator according to a third exemplary embodiment.

FIG. 10 is an exploded perspective view of the vibration type actuator according to the third exemplary embodiment of the present disclosure, and a radial direction, a rotation direction, and a pressure direction of the vibration type actuator are respectively defined as an X direction, a θ direction, and a Z direction. FIG. 11 is a Z-X cross-sectional view of the vibration type actuator according to the third exemplary embodiment.

The present exemplary embodiment is characterized in that three vibrating bodies 202 (202-1, 202-2, and 202-3) are held by a ring base 206. A configuration and a drive principle of the vibrating bodies 202 are similar to those according to the first exemplary embodiment, so that the descriptions thereof are omitted.

Three sets of projection portions and loose fitting portions that exert functions similar to those according to the first exemplary embodiment are provided on the ring base 206 at every 120 degrees and respectively hold and loosely fit the vibrating bodies 202. Flexible printed boards in the vibrating bodies 202 are connected by connection flexible printed boards (not illustrated), and a same driving voltage is applied to piezoelectric elements.

A rotor 211 as a driven body abuts on projection portions of the vibrating bodies 202 and is rotated by a driving force generated in a tangential direction. A vibration absorbing rubber 212 is arranged above the rotor 211, and the rotor 211 and the vibration absorbing rubber 212 are each held in a state rotatable together with an output transmission member 216.

On the other hand, the ring base 206 is combined with an inner cylinder 217 at a part (not illustrated), and a movement in a central axis direction and a radial direction and rotation about a central axis are restricted.

A pressure auxiliary member 207 having predetermined rigidity is arranged below the ring base 206 and equalizes a pressure force applied by a wave washer 208 as a pressure member. A pressure reception member 209 is arranged below the wave washer 208.

The pressure reception member 209 engages with the inner cylinder 217 by a screw or a bayonet structure at an inner diameter side thereof. A vibration type actuator 201 rotates and moves the pressure reception member 209 in the central axis direction, so that the wave washer 208 is compressed. The ring base 206 to the output transmission member 216 are pressed and pinched by an outer cylinder 213, the inner cylinder 217, and the pressure reception member 209. Balls 214 and retainers 215 are provided between the outer cylinder 213, the inner cylinder 217, and the output transmission member 216, and rotatably support the output transmission member 216 while being pressed. The outer cylinder 213 and the inner cylinder 217 are connected by a lid 210 being screwed thereto.

According to the present exemplary embodiment, the case is described in which three vibrating bodies 202 are provided. However, the number of the vibrating bodies 202 is not limited to the above-described case and may be any number more than one as long as the vibrating bodies 202 can be arranged on the ring base 206.

According to a fourth exemplary embodiment, a case is described in which a friction plate 303 as a driven body is sandwiched between two vibrating bodies 302. The present exemplary embodiment relates to a vibration type actuator including a configuration in which a contact body is sandwiched between a pair of vibrating bodies.

Figure 13:
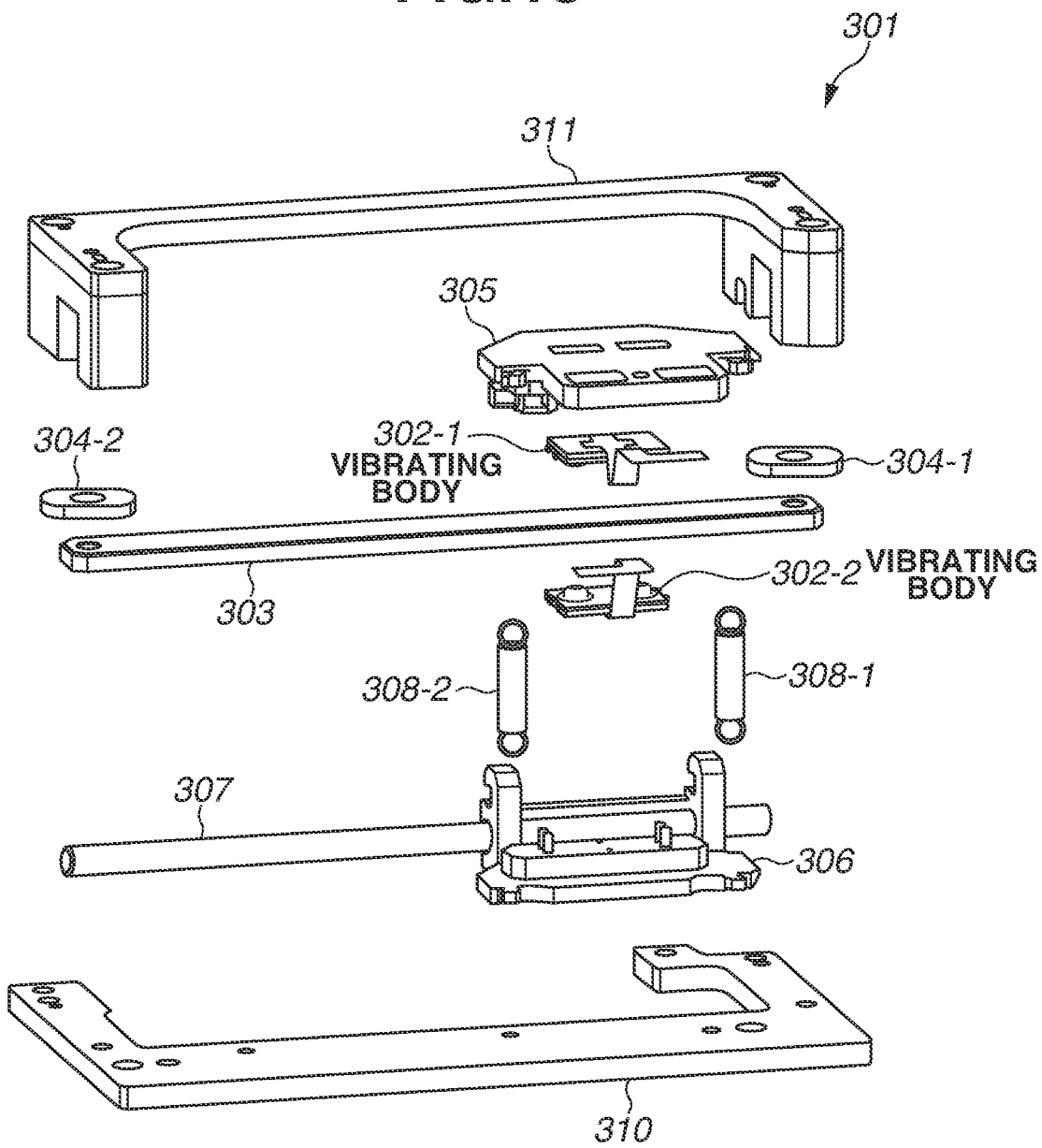
FIG. 13 is an exploded perspective view of a vibration type actuator according to a fourth exemplary embodiment.
Figure 14:
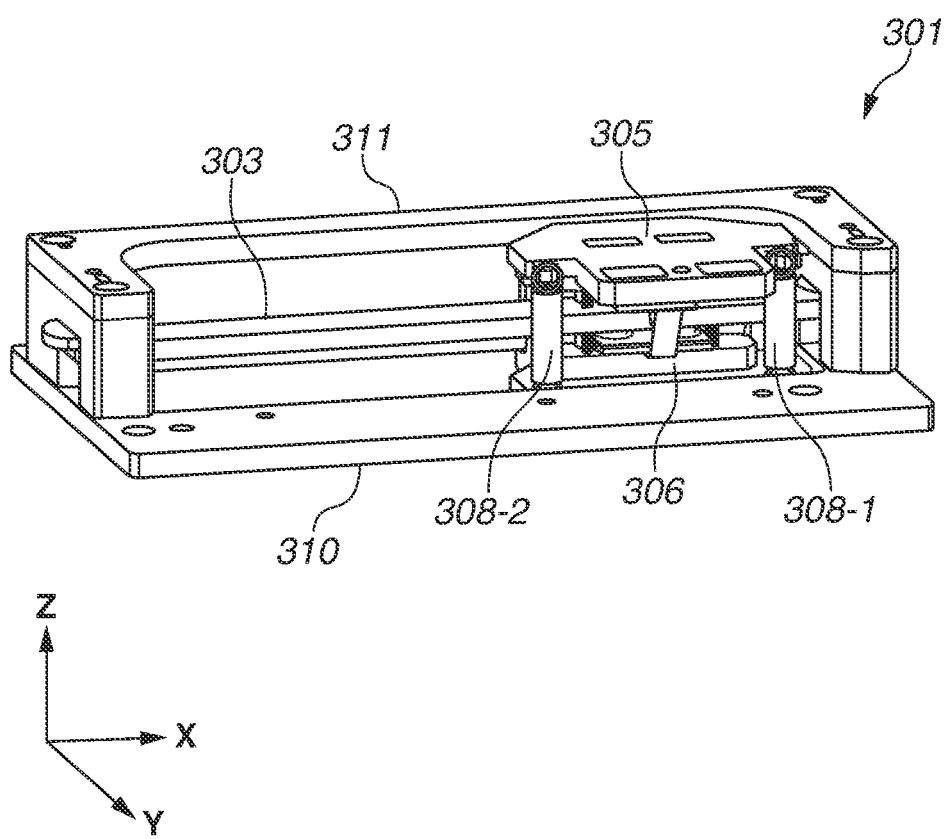
FIG. 14 is an assembly perspective view of the vibration type actuator according to the fourth exemplary embodiment.

A movement direction and a pressure direction of the vibrating bodies 302 are respectively defined as an X direction and a Z direction, and a direction perpendicular to the X direction and the Z direction is defined as a Y direction. The configuration and the drive principle of the vibrating bodies 302 are similar to those according to the first exemplary embodiment, so that the descriptions thereof are omitted. FIGS. 13 and 14 are respectively an exploded perspective view and an assembly perspective view of the vibration type actuator according to the fourth exemplary embodiment.

The vibrating body 302-1 is pressed by an upper pressure member 305 in a downward direction in FIG. 13. The vibrating body 302-2 is pressed by a lower pressure member 306 in an upward direction in FIG. 13. The vibrating bodies 302-1 and 302-2 are each in contact with the friction plate 303. The friction plate 303 is fixed to a friction plate holder 311 via a vibration absorbing rubber 304. The upper pressure member 305 and the lower pressure member 306 engage with each other so as to be rotatable about an X axis and are applied with a pressure force by tension springs 308 (308-1 and 308-2). The upper pressure member 305 and the lower pressure member 306 receive a pressure reaction force of each other and function as pressure reception members. Coil portions of the tension springs 308 are omitted to simplify the drawing.

A guide bar 307 engages with the lower pressure member 306 and supports the lower pressure member 306 to be slidable in the X direction while restricting a movement in the Z and the Y directions. The guide bar 307 is sandwiched and fixed between the friction plate holder 311 and a fixing member 310.

Flexible printed boards in the vibrating bodies 302-1 and 302-2 are connected by connection flexible printed boards (not illustrated), and a same driving voltage is applied to piezoelectric elements. A thrust force in the X direction is generated by elliptical motion or circular motion generated on projection portions of the vibrating bodies 302. Thus, the vibrating bodies 302, the upper pressure member 305, the lower pressure member 306, and the tension springs 308 move together in the X direction.

A vibration type actuator can be used, for example, for driving a lens in an image capturing apparatus (optical apparatus). An image capturing apparatus is described as an example of using a vibration type actuator to drive a lens arranged in a lens barrel.

In other words, a fifth exemplary embodiment relates to an optical apparatus including a lens, an image pickup element, and the above-described vibration type actuator and configured to change a relative position between the lens and the image pickup element by driving the vibration type actuator.

Figure 15A:
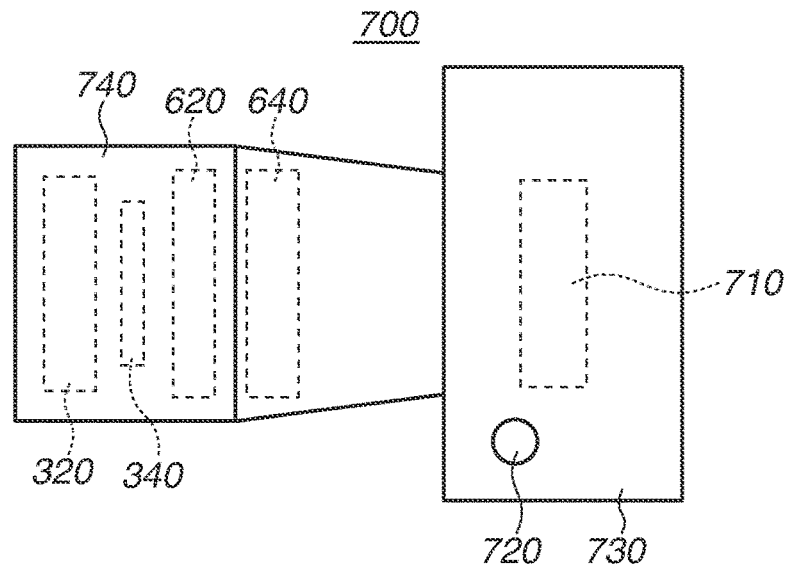
FIGS. 15A and 15B are respectively a top view and a block diagram of a schematic configuration of an image capturing apparatus using a vibration type actuator according to a fifth exemplary embodiment.

FIG. 15A is a top view illustrating a schematic configuration of an image capturing apparatus 700. The image capturing apparatus 700 includes a camera body 730 having an image pickup element 710 and a power source button 720. The image capturing apparatus 700 further includes a lens barrel 740 including a first lens group 300 (not illustrated in FIG. 15A), a second lens group 320, a third lens group 330 (not illustrated in FIG. 15A), a fourth lens group 340, and vibration type driving devices 620 and 640. The lens barrel 740 is exchangeable as an interchangeable lens, and the lens barrel 740 suitable for an imaging target can be attached to the camera body 730. In the image capturing apparatus 700, two vibration type driving devices 620 and 640 respectively drive the second lens group 320 and the fourth lens group 340.

The detailed configuration of the vibration type driving device 620 is not illustrated, but the vibration type driving device 620 includes a vibration type actuator and a driving circuit of the vibration type actuator. A rotor 211 is arranged in the lens barrel 740 so that a radial direction thereof is substantially orthogonal to an optical axis. In the vibration type driving device 620, the rotor 211 is rotated about the optical axis, and a rotation output of a driven body is converted into rectilinear motion in an optical axis direction via a gear (not illustrated). In this way, the second lens group 320 is moved in the optical axis direction. The vibration type driving device 640 includes a configuration similar to that of the vibration type driving device 620 and moves the fourth lens group 340 in the optical axis direction.

Figure 15B:
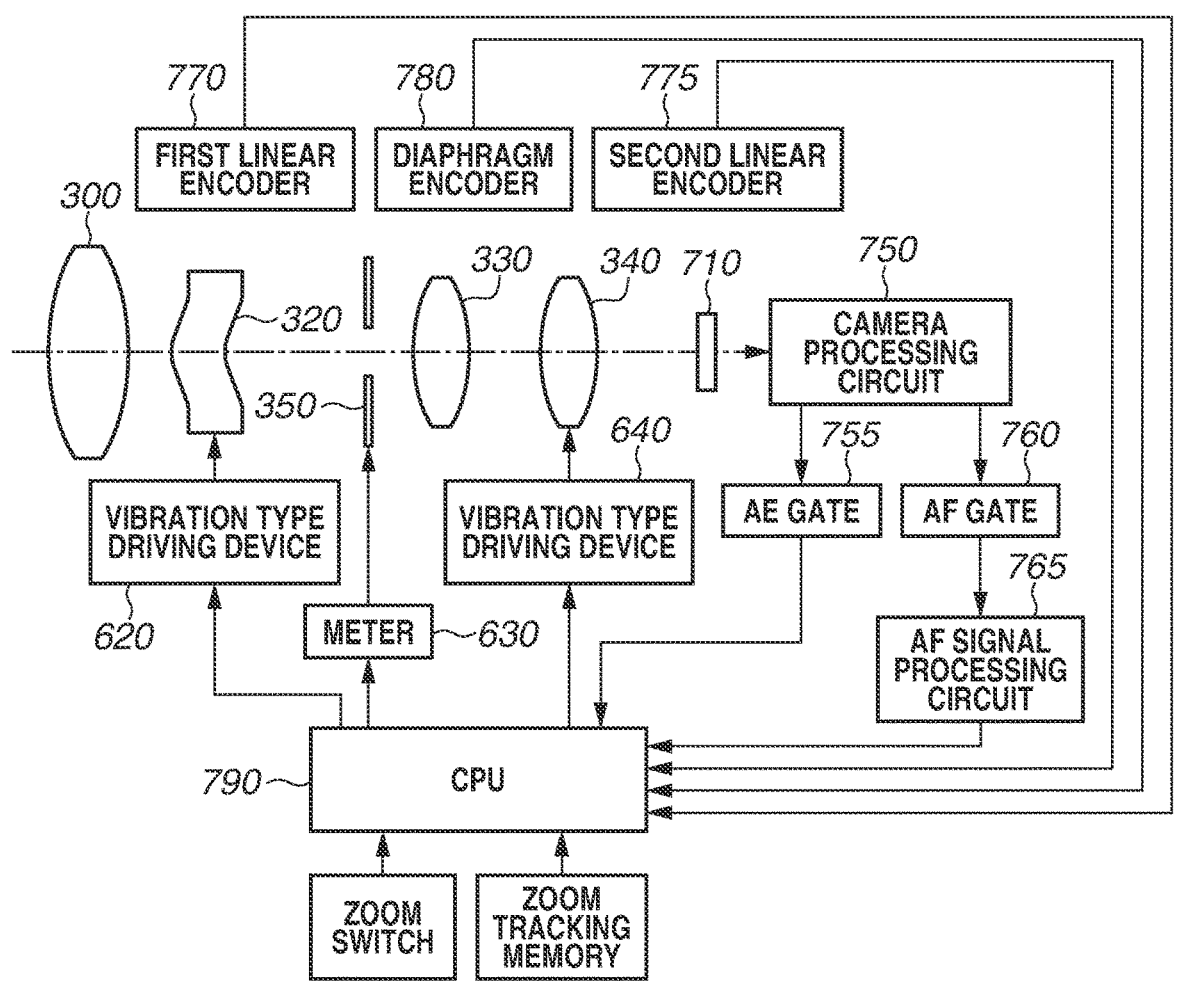

FIG. 15B is a block diagram illustrating a schematic configuration of the image capturing apparatus 700. The first lens group 300, the second lens group 320, the third lens group 330, the fourth lens group 340, and a light amount adjustment unit 350 are arranged at predetermined positions on the optical axis in the lens barrel 740. Light passing through the first lens group 300, the second lens group 320, the third lens group 330, the fourth lens group 340, and the light amount adjustment unit 350 forms an image on the image pickup element 710. The image pickup element 710 converts an optical image into an electrical signal and outputs the electrical signal to a camera processing circuit 750.

The camera processing circuit 750 performs amplification, gamma correction, and other processing on the output signal from the image pickup element 710. The camera processing circuit 750 is connected to a central processing unit (CPU) 790 via an automatic exposure (AE) gate 755. The camera processing circuit 750 is also connected to the CPU 790 via an automatic focus (AF) gate 760 and an AF signal processing circuit 765. A video signal subjected to predetermined processing in the camera processing circuit 750 is transmitted to the CPU 790 via the AE gate 755 and via the AF gate 760 and the AF signal processing circuit 765. The AF signal processing circuit 765 generates an evaluation value signal for AF by extracting a high-frequency component from the video signal and supplies the generated evaluation value to the CPU 790.

The CPU 790 is a control circuit for controlling operations of the entire image capturing apparatus 700, and generates from the obtained video signal a control signal for determining an exposure and focusing. In order to obtain a suitable focusing state and the determined exposure amount, the CPU 790 controls driving of the vibration type driving devices 620 and 640 to adjust positions of the second lens group 320, the fourth lens group 340 in the optical axis direction. The CPU 790 also controls the aperture size by adjusting the meter 630 serving as a driving source for the light amount adjustment unit 350. Under control of the CPU 790, the vibration type driving devices 620 and 640 respectively move the second lens group 320 and the fourth lens group 340 in the optical axis direction, and the meter 630 controls driving of the light amount adjustment unit 350.

A first linear encoder 770 detects the position in the optical axis direction of the second lens group 320 driven by the vibration type driving device 620 and notifies the CPU 790 of a detection result, and the detection result is fed back to driving of the vibration type driving device 620. Similarly, a second linear encoder 775 detects the position in the optical axis direction of the fourth lens group 340 driven by the vibration type driving device 640 and notifies the CPU 790 of a detection result, and the detection result is fed back to driving of the vibration type driving device 640. A diaphragm encoder 780 detects the aperture size of the light amount adjustment unit 350 and notifies the CPU 790 of a detection result, and the detection result is fed back to driving of the meter 630.

The present disclosure can be applied to various electronic apparatuses in addition to the above-described configurations.

In other words, according to the present disclosure, an electronic apparatus can be provided which includes a member and the above-described vibration type actuator for driving the member.

The present disclosure is suitable for a driving actuator.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-158972, filed Aug. 30, 2019, which is hereby incorporated by reference herein in its entirety.

What is claimed is:

1. A vibration type actuator comprising:
a vibrating body including an elastic body and an electro-mechanical energy conversion element;
a contact body contacting the vibrating body;
a flexible printed board including a wiring pattern and a non-wiring portion made of resin, provided with a concave portion on a surface of the non-wiring portion opposite to a surface contacting the electro-mechanical energy conversion element and configured to supply electric power to the electro-mechanical energy conversion element; and
a holding member provided with a projection portion engaging with the concave portion.

2. The vibration type actuator according to claim 1, wherein the concave portion is arranged near a point at which two different node lines in a vibration wave generated in the vibrating body intersect.

3. The vibration type actuator according to claim 1, wherein the flexible printed board includes wiring patterns and a non-wiring portion in which the wiring pattern is not formed, and the concave portion is configured with the non-wiring portion and the wiring patterns provided on both sides of the non-wiring portion.

4. The vibration type actuator according to claim 3, wherein a resin film covers the non-wiring portion and the wiring patterns provided on the both sides of the non-wiring portion in the flexible printed board.

5. The vibration type actuator according to claim 1, wherein the vibration type actuator is configured to maintain positions of the vibrating body and the holding member in a case where the vibration type actuator is driven.

6. The vibration type actuator according to claim 1,
wherein the elastic body is rectangular, and
wherein, among points at which two node lines generated along a longitudinal direction of the elastic body in a primary out-of-plane bending vibration mode A intersect with three node lines generated along a transverse direction of the elastic body in a secondary out-of-plane bending vibration mode B, the holding member is provided on two points on a center node line in the three node lines.

7. The vibration type actuator according to claim 1, wherein the elastic body is rectangular and is provided with a rectangular portion and at least two extending portions that are independent of each other, and a different projection portion provided on the holding member is in contact with the rectangular portion and the extending portions.

8. The vibration type actuator according to claim 7, wherein a plurality of the different projection portions loosely fits and supports four corners of the rectangular portion of the elastic body.

9. The vibration type actuator according to claim 1, wherein the electro-mechanical energy conversion element is a piezoelectric element including a piezoelectric material with a lead content of 1000 ppm or less.

10. The vibration type actuator according to claim 1, wherein a plurality of the vibrating bodies is arranged with respect to the contact body having an annular shape.

11. The vibration type actuator according to claim 1, wherein the contact body is disposed between a pair of the vibrating bodies.

12. An optical apparatus comprising:
a lens;
an image pickup element; and
the vibration type actuator according to claim 1,
wherein a relative position between the lens and the image pickup element is changed by driving the vibration type actuator.

13. The optical apparatus according to claim 12, wherein a position of the lens is changed by driving the vibration type actuator.

14. An electronic apparatus comprising:
a member; and
the vibration type actuator according to claim 1 configured to drive a position of the member.

* * * * *